INVENTORS
DON R. OSBORN, JR.
RICHARD A. ROGERS
BY
THEIR ATTORNEY

May 9, 1961 D. R. OSBORN, JR., ET AL 2,983,136
AIR GAUGE
Filed March 15, 1957 2 Sheets-Sheet 2
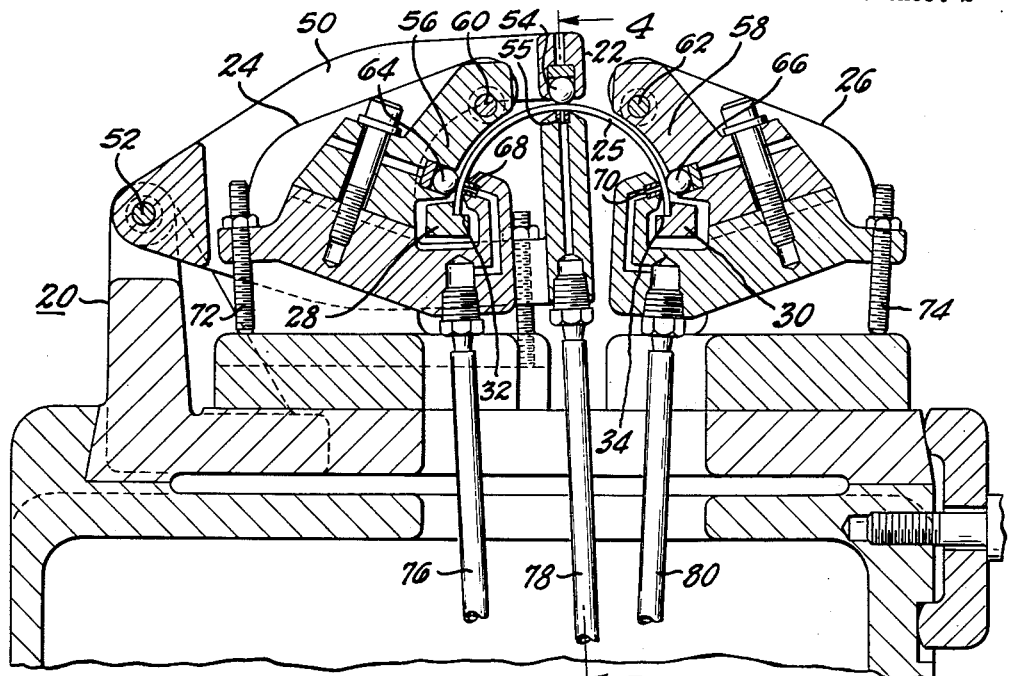
Fig. 3.
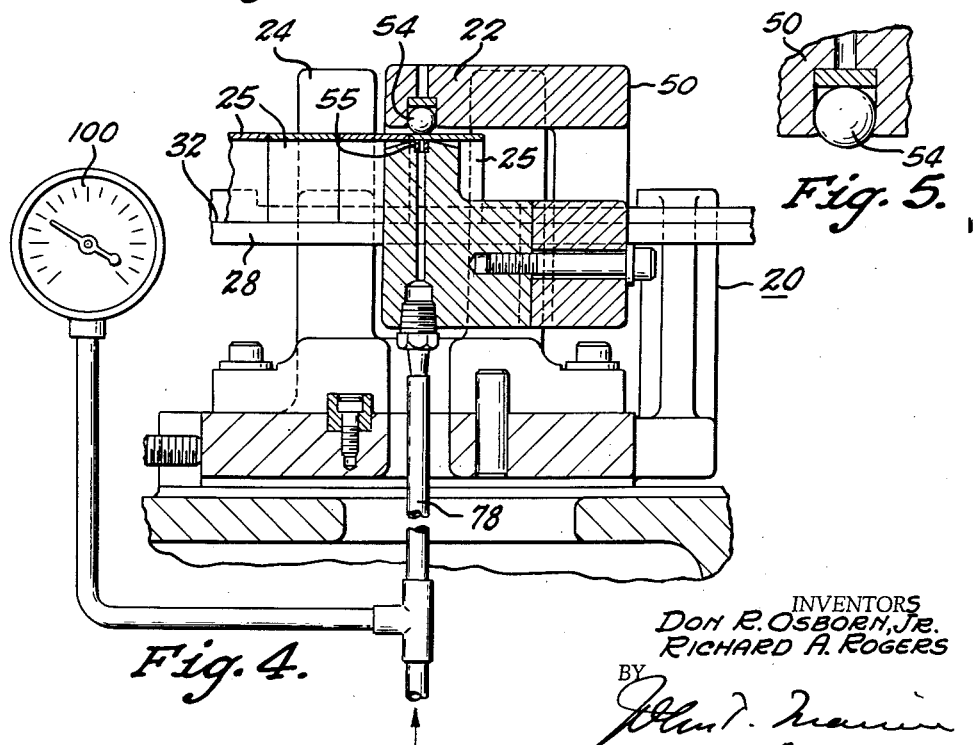
Fig. 4.
Fig. 5.
INVENTORS
DON R. OSBORN, JR.
RICHARD A. ROGERS
BY
THEIR ATTORNEY

United States Patent Office 2,983,136
Patented May 9, 1961

2,983,136

AIR GAUGE

Don R. Osborn, Jr. and Richard A. Rogers, Dayton, Ohio, assignors to General Motors Corporation, Detroit, Mich., a corporation of Delaware Filed Mar. 15, 1957, Ser. No. 646,272

3 Claims. (Cl. 73—37.5)

This invention relates to gauges and is particularly concerned with gauges of the air gauge type.

One of the objects of the invention is to provide an air gauge that is automatically adjustable for gauging a plurality of substantially similar objects sequentially wherein the gauge provides a plurality of readings on different parts of each object.

Another object of the invention is to provide an air gauge for gauging semicylindrical bearings wherein the bearings are gauged for thickness at three points and wherein the gauge is automatically adjustable to accept the bearings therein.

A still further object of the invention is to provide an air gauge for gauging the thickness of a metal part wherein a ball-like anvil is provided, spaced from an air port, so that the gauge acts in the order of a snap gauge to quickly accept the part to be gauged which is fed into the gauge on a fixed track.

Still another object of the invention is to provide an air gauge having three gauging devices, all of which are pivotally mounted and spaced around a track upon which the article to be gauged is moved. The pivotal mounting of the several gauging devices permitting self-alignment of the gauge to accept the article to be gauged as it slides on the track into the gauging area.

Further objects and advantages of the present invention will be apparent from the following description, reference being had to the accompanying drawings wherein preferred embodiments of the present invention are clearly shown.

In the drawings:

Figure 3 is a section taken on line 3—3 of Figure 2.

Figure 4 is a section taken on line 4—4 of Figure 3.

Figure 5 is an enlarged view of one gauge ball and its mounting.

Figure 1:
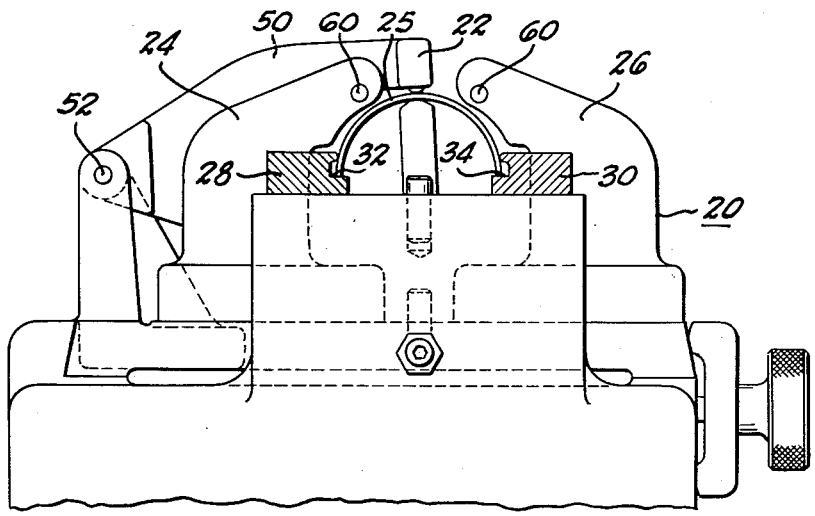
Figure 1 is a side view of the gauge.

Air gauges have been used for some time to gauge accurately dimensional factors in parts being manufactured. These air gauges are simple in the operation having a minimum of moving parts, are extremely accurate since there is very little to become maladjusted and are quirk to use since, in most instances, they are in the order of a plug or snap gauge.

The principle used in air gauges in general is to provide a source of constant air pressure which exhausts from an orifice at a constant back pressure and to then control the flow of air from the source by means of a moving part which is spring pressed against the portion to be gauged to thereby throttle down the flow of air so that an air gauge reading determines the accuracy of the part to be gauged. One of such gauges for measuring the bore of machined parts is shown in Patent 2,572,-368. In this instance, the gauge is in the order of a plug gauge which fits within a bore whereby the accuracy of the bore may be determined. Another gauge of similar type is shown in Patent 2,477,889. In this instance, the gauge is used to measure the accuracy of threaded objects. In each instance, a source of air pressure is supplied wherein the air from the source flows through an orifice and is throttled by means of a gauging element for producing measurable back pressure.

The present invention utilizes much of the same principle although the specific structure of the gauge is entirely different. In the present instance, the part to be gauged is a semicylindrical bearing, such as a half round bearing used in connection with connecting rods and main bearings of internal combustion engines. These bearings must be machined to a high degree of accuracy in the order of a few one-thousandths of an inch so that the bearings are completely interchangeable and require no scraping or other adjustments when used in the engine. The important dimensional tolerance which must be maintained in these bearings is the thickness thereof which must be very accurate and constant throughout the extent of the bearing. For this purpose, it has been found that the bearing should be gauged adjacent its two ends and also at the center portion since, if the bearing is accurately machined at these three gauge points, it is generally satisfactory for its intended use. Bearings of this character are normally machined by means of a broach which acts on the bearings as they are held in a nest by pressure applied to the split line or end surfaces thereof whereby the bearing is firmly and properly seated in the nest.

In the past, these bearings have been gauged manually on snap gauges wherein an inspector must move each bearing to three different positions on the gauge. This was not only time-consuming but also required additional space and equipment which should preferably be included with the broaching machine.

The present gauge eliminates the necessity for this manual operation and, through the incorporation of three separate air gauges, permits the mounting of the gauge at the end of the broaching machine whereby a single inspector may monitor two broaching machines and never handle any of the bearings except those that are rejected. One of the problems which has previously prevented the use of air gauges in this connection was the necessity of having the gauge self-centering or self-adjusting so that the gauge would quickly accommodate itself to bearings being slipped therein without manual adjustments. The present invention has solved these problems through the use of rocking gauge members which self-adjust for any of the usual conditions encountered in the inspection operation.

Figure 2:
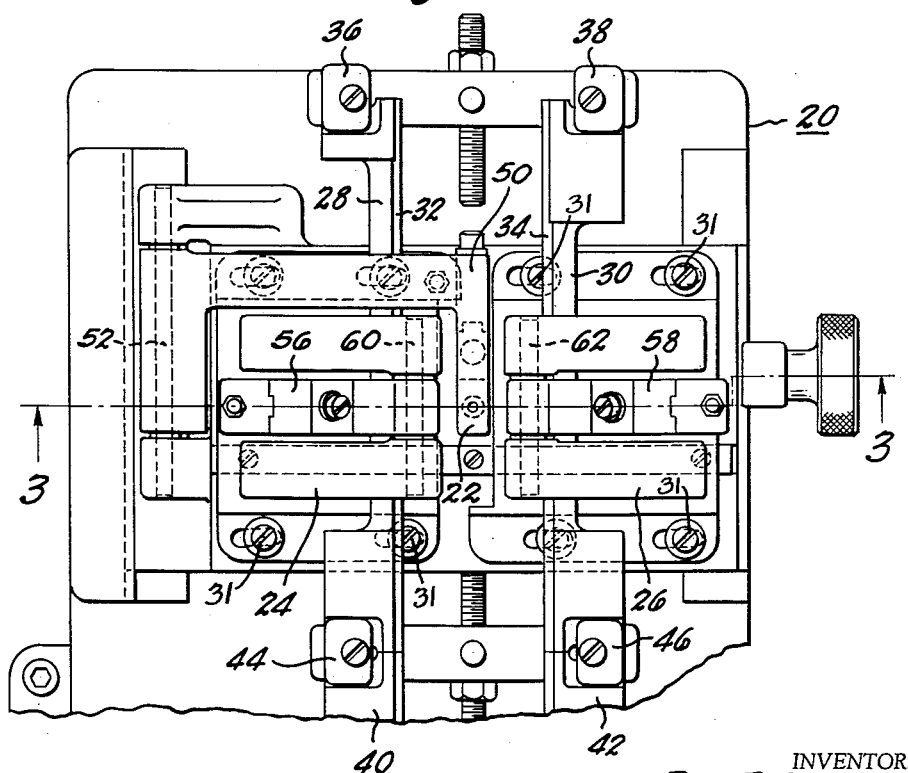
Figure 2 is a top view of the gauge.

Specifically, the gauge is shown at 20 in Figure 1 and includes three gauging elements, 22, 24 and 26. The bearings 25, or other articles to be gauged, pass into the gauge on a pair of parallel ways or tracks noted at 28 and 30. These tracks are longitudinally grooved as at 32 and 34, respectively, to properly hold bearings being fed thereto from the broach or other source of supply. The bearings 25, when fully assembled in the track, take on the appearance of a continuous semicylindrical tube as shown in Figure 4 and they must necessarily be fed stepwise to the gauge through a predetermined increment of movement so that each bearing is laterally spaced centrally of the gauge during the gauging operation. The track is adjustably mounted as noted in Figure 2 abutting against two stop members 36 and 38 at one end and extending outwardly of the gauge at 40 and 42 at the other end wherein it is laterally adjustable through adjustments 44 and 46. The gauge members are also adjustable by means of bolts 31 noted in Figure 2 passing through slots in the gauge members so that the gauge members can be adjusted laterally with respect to the tracks 28 and 30 and then locked in position.

Referring specifically to Figure 3, the gauge is shown in sectional detail wherein the central gauging member is an arm 50 pivoted at 52 and carrying a snap gauge portion at 54 and 55. Portion 54 is specifically a tungsten carbide ball suitably held against displacement from the member as shown in Figure 5 while 55 is an air port immovably positioned in spaced relation to the ball 54. This spacing is adjustable and must be exactly correct for the gauging factor desired. The two side gauges are shown at 56 and 58 and are members pivoted at 60 and 62, respectively. Each of the members 56 and 58 includes a gauge portion comprising a ball 64 and 66 associated with an air port 68 and 70, respectively. In each instance, the gauge portion is identical to the central gauge previously discusssed wherein the port or jet is spaced a predetermined distance from the ball. The movable positions of the two pivoted members 56 and 58 can be adjusted to a degree through adjustment screws or stop members 72 and 74 so that they are properly aligned with the tracks 28 and 30 and grooves 32 and 34, respectively. The air ports or orifices 55, 68 and 70 are all connected by ducts to resilient connections such as hoses 76, 78 and 80, respectively, which are, in turn, connected to a source of air pressure such as a pressure reservoir (not shown). Thus, it will be seen that the members 50, 56 and 58 are all pivotally mounted and may swing through a limited degree for self-adjustment.

Bearings, one of which is shown at 25, are fed down the tracks 28 and 30 and have their split line or end surfaces firmly seated in the grooves 32 and 34. As they pass into the gauge, the balls 64, 54 and 66 ride onto the back surfaces thereof and quickly align or position the gauge with respect to the bearing. At the same time, air under pressure is being supplied to the ports 55, 68 and 70 and these ports are positioned a predetermined distance from the bearing surface of the bearing 25. The normal spacing between the port and the closest portion of its associated ball is greater than the greatest tolerance for oversize in the bearing. In other words, the spacing will accept any bearing under normal conditions. In this manner, a bearing, when in position in the gauge, will tend to throttle down the flow of air from the several ports in accordance with its thickness and since each of the hoses 76, 78 and 80 is attached through T connection to an indicating "Bourdon type" air gauge as shown in Figure 4 at 100. Thus, it is possible, by observing the indicating gauges 100, to determine the thickness of the several portions being gauged of the bearing.

For example, under one set of conditions, with no bearing in place, the gauge will register a normal back pressure of ten pounds which indicates the normal minimum restriction of air flow from the exhaust port or jet. When the bearing is in place, having a thickness of .0625 inch which is the desired thickness, the gauge will read thirty-five pounds indicating a specific restriction to the normal air flow. As the thickness of the bearing increases, it will be found that the gauge pressure will increase about five pounds for each one ten-thousandth of an inch increase in thickness. Similarly, as the thickness of the bearing decreases, below the optimum figure of .0625, the gauge pressure will decrease apuroximately five pounds for each one ten-thousandth of an inch decrease in thickness. Normally, a bearing is acceptable plus or minus .0002. Therefore, any bearing, after insertion in the gauge, which causes the air gauges to read between the figures of twenty-five and forty-five pounds, will be acceptable. If the gauge reads over forty-five pounds or under twenty-five pounds, the bearing is not acceptable. By masking out portions of the indicating gauge dial that include unacceptable readings, it is an easy matter for an operator to glance at the gauge and, if the needle is not visible, to automatically note the bearing is unacceptable and thereby discard the bearing as it falls from the track. It is also an easy matter for the operator to use the same system of observation with the three gauges which are set in close proximity so that, if any one of the three gauges fails to show the needle in the unmasked portion, the bearing will be discarded.

Normally, the air pressure is maintained effective at all times since the ports are small and the loss of air is negligible. However, it is understood that the air pressure can be intermittently applied so that the air pressure is only effective when the bearing is nested in gauging position in the gauge and automatically shuts off when the bearing is ejected from the gauge.

The extreme accuracy of the gauge noted and the ease of its operation are attributed to the floating nature of the several gauge members which independently and automatically seek the proper level with respect to the portion of the bearing being gauged. The pivot point for each of the gauge members is located so that the gauging portion swings in substantially a straight line, that is to say, the arc is at a minimum so that the gauge alignment is not effected by the minimum swing. It will be noted that in each instance the carbide ball is backed up by a hard steel pad so that the distance between the ball and its associated jet or orifice port is fixed and predetermined. The walls of the orifice ports are likewise preferably fabricated from a hard steel so that they do not vary in their spacing due to any slight wear which might occur, although there is very little opportunity for wear to occur with respect to the walls of the orifice ports since the balls ride on the external surfaces of the bearing and automatically adjust the orifices into proximity with the inner surfaces of the bearing and the only time that the walls of the orifices could possibly touch the bearing is with a bearing completely outside of all tolerance limits, in which case the bearing surface would be marred by the sliding action of the walls of the orifices thereover. Obviously, this is an undesirable condition since the bearing surface is highly polished and should not be touched by any medium and, therefore, it is desirable to keep the orifices in spaced relation thereto under all circumstances and this particular condition is maintained by the original adjustment of the gauge.

While the embodiments of the invention as herein disclosed constitute preferred forms, it is to be understood that other forms might be adopted.

What is claimed is as follows:

1. An air gauge for measuring the relative thickness of a metal part, comprising in combination, a holding fixture for holding a part to be measured, a plurality of bifurcated gauge members each including two spaced arms, a ball mounted on one arm of each member, the other arm of each member carying an air port aligned with and in opposed relation to said ball and spaced at a fixed and predetermined distance therefrom which is greater than the maximum thickness of the part to be measured, independent pivots for said members carried on said fixture, said pivots permitting limited pivotal movement of the members in one direction with respect to said fixture whereby the balls are normally positioned so as to initially contact one surface of a metal part held by the holding fixture for causing the balls to ride upon said one surface and thereby automatically pivotally adjust the members relative to the part for bringing the air ports into proximity with another surface of the part, flexible air connections connecting the ports to a source of air pressure, and indicating means sensitive to changes in back pressure adjacent said ports for indicating the relative thicknesses of the part being measured.

2. An air gauge for measuring the relative thickness of a semicylindrical bearing having a bearing surface at its concave side, comprising in combination, a grooved track including spaced ways adapted to act as seats for the ends of the bearing to be measured and slidable along said track, a pivotally mounted gauge member including two spaced arms adapted to embrace a portion of the bearing, a ball mounted on one of said arms, the other of said arms carrying an air port aligned with and facing the ball and spaced at a fixed and predetermined distance therefrom greater than the maximum thickness of the bearing, said gauge member being positioned with respect to the track so that the ball is normally positioned so as to initially contact the back surface of a bearing sliding along said track for causing the ball to ride upon the back surface of the bearing and thereby automatically pivotally adjust the member relative to the bearing on said track for bringing the air port into proximity with the bearing surface, a flexible air connection connecting the port to a source of air pressure, and indicating means sensitive to back pressure changes adjacent said port for indicating the relative thickness of the bearing being measured.

3. An air gauge for measuring the relative thickness at three spaced points of a semicylindrical bearing having a bearing surface at its concave side, comprising in combination, a grooved track including spaced ways adapted to act as seats for the ends of the bearing to be measured and slidable along said track, three separate gauge members each comprising two spaced arms consisting of an outer arm and an inner arm wherein each outer arm includes a ball mounted therein and each inner arm includes an air port aligned with and facing the ball, said gauge members all being pivotally mounted and having the balls and air ports spaced from one another a predetermined fixed distance greater than the maximum thickness of the bearing, independent pivotal mountings each having a pivot fixed with relation to one another and to the track for said members whereby the ball of each member will ride upon spaced portions of the back surface of a bearing slidably positioned on said track for automatically pivotally and independently adjusting its associated member relative to the bearing on said track for bringing the associated air port into proximity with the bearing surface, independent flexible air connections connecting each port to a source of air pressure, and independent indicating means sensitive to changes in back pressures adjacent each port for indicating the relative thickness of the bearing adjacent each port.

References Cited in the file of this patent
UNITED STATES PATENTS

| | | |
|---|---|---|
| 2,477,399 | Aller | July 26, 1949 |
| 2,501,130 | Kuppersmith | Mar. 21, 1950 |
| 2,571,917 | Mennesson | Oct. 16, 1951 |
| 2,587,774 | Shack et al. | Mar. 4, 1952 |
| 2,590,170 | Gates | Mar. 25, 1952 |
| 2,651,412 | Aller | Sept. 8, 1953 |